United States Patent [19]

Massucco

[11] 4,429,094
[45] Jan. 31, 1984

[54] OPTICALLY TRANSPARENT RADIATION SHIELDING MATERIAL

[75] Inventor: Arthur A. Massucco, Natick, Mass.

[73] Assignee: Arthur D. Little, Inc., Cambridge, Mass.

[21] Appl. No.: 251,504

[22] Filed: Apr. 6, 1981

[51] Int. Cl.³ .................. C08F 120/18; C08F 4/06; E04B 1/12
[52] U.S. Cl. .................. 526/240; 526/329.7; 526/192; 252/478
[58] Field of Search .......... 252/478; 526/329.7, 526/240, 192

[56] References Cited

U.S. PATENT DOCUMENTS 4,129,524 12/1978 Nagai et al. .................. 252/478

FOREIGN PATENT DOCUMENTS 1123725 8/1968 United Kingdom .......... 526/329.7

*Primary Examiner*—Deborah L. Kyle
*Assistant Examiner*—Catherine S. Kilby
*Attorney, Agent, or Firm*—Richard J. Hammond

[57] ABSTRACT

An optically transparent organometallic polymer is disclosed prepared from a polyvalent metal salt-containing monomer of the formula

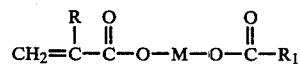

wherein M is a polyvalent metal, R is $C_1$ to $C_{12}$ alkyl, $R_1$ is $C_1$ to $C_{12}$ alkyl, phenyl or naphthyl unsubstituted or substituted with $C_1$ to $C_6$ alkyl, $C_1$ to $C_6$ alkoxy, amino, $C_1$ to $C_4$ alkylamino, di-$C_1$ to $C_4$ alkylamino, nitro or halo or heterocyclic aryl, the heteroatom selected from the group nitrogen, oxygen and sulfur. A process for preparing these high metal content optically transparent materials is disclosed. The polymers are useful in forming transparent radiation barrier sheets and films.

17 Claims, No Drawings

OPTICALLY TRANSPARENT RADIATION SHIELDING MATERIAL

BACKGROUND OF THE INVENTION

1. Field of the Invention

The present invention relates to organometallic polymers. More particularly, the invention relates to optically transparent polyvalent metal-containing monomers and polymers and processes for preparing them.

2. Description of the Prior Art

Organometallic polymers have been prepared primarily from ethylenically-based monomers. For example, U.S. Pat. No. 3,974,104 discloses that a tin-containing copolymer can be obtained by copolymerizing an ester of trialkyl tin and an ethylenically unsaturated acid (acrylic acid, etc.) with one or more ethylenically unsaturated monomers. The copolymers thus formed contain about 2.5–10% by weight of tin and are noted to be advantageously used as radiopaque and transparent denture base materials. Similar copolymers have been formed from, for example, lead dimethacrylate and lead dimethylmethacrylate. Transparency is lost however at only 6% lead methacrylate content.

A variety of methods have been devised to increase the metal content of these polymers in order to enhance their ability to act as radiation barriers while at the same time still maintain their optical transparency. Such efforts have included adding radiopaque materials to polymeric powders and to monomeric liquids in simple admixture or in the polymerization procedure. The admixture approach has, however, not attained the success desired principally because such techniques greatly decrease the physical properties of the final product. Further, many of the radiopaque materials migrate (bleed) from the polymer substrate.

One of the most successful approaches for producing radiopaque, transparent polymers of high metal content has been by using a combination of the above-two general methods. For example, U.S. Pat. No. 4,129,524 discloses a radiation shielding polymer composition that comprises (a) a copolymer of an alkyl methacrylate, a hydroxyalkyl acrylate, a hydroxyalkyl methacrylate or styrene and (b) lead diacrylate or lead dimethacrylate in combination with a lead carboxylate. The ratios of component (b) to lead carboxylate are critical to the preparation of a sufficiently transparent, radiopaque polymer having good mechanical strength. Accordingly, the maximum lead content in the composition is about 32% by weight, corresponding to a lead equivalent of about 1.1 mm lead per inch of radiation shield. Effective radiation barriers are difficult to fabricate from these compositions because of the thickness necessary to be an effective barrier and once formed are undesirably heavy.

High metals-content, transparent organometallic polymers have been heretofore unavailable.

It is an object of the present invention to provide a transparent organometallic polymer of higher metals content without the use of additives.

It is a further object of the present invention to provide a novel transparent radiation shielding material.

It is an additional object of the present invention to provide a process for producing a transparent radiation shielding organometallic polymer of high metal content without the use of additives.

These and other objects can be attained by reference to the Detailed Description of the Preferred Embodiment.

DETAILED DESCRIPTION OF THE PREFERRED EMBODIMENTS

The present invention is an optically transparent polymer prepared from a polyvalent metal-salt containing monomer of the formula

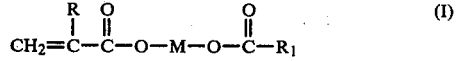

wherein M a polyvalent metal, $R_1$ is $C_1$ to $C_{12}$ alkyl, phenyl or naphthyl unsubstituted or substituted with $C_1$ to $C_6$ alkyl, $C_1$ to $C_6$ alkoxy, amino, $C_1$ to $C_4$ alkylamino di $C_1$ to $C_4$ alkylamino, nitro or halo or heterocyclic aryl, the heteroatom selected from the group nitrogen, oxygen and sulfur.

In the monomer of Formula I, it is preferred that the polyvalent metal is a cation of a metal selected from the group magnesium, zinc, strontium, cadmium, calcium, mercury and lead, most preferably strontium, mercury and lead. A particularly preferred metal in the monomer of Formula I is lead.

It is further preferred in the monomer of Formula I that the moiety R is $C_1$ to $C_4$ alkyl and $R_1$ is selected from the group $C_1$ to $C_8$ alkyl. Most preferably R is methyl or ethyl and $R_1$ is selected from the group methyl, ethyl, isopropyl, isobutyl and 2-ethylhexyl.

Partial substitution of the monomer of Formula I with other copolymerizable monomers or mixtures of comonomers to the extent that no diliterious effects on metal content, physical properties or transparency of the final product polymer is also encompassed within the scope of the present invention. Such copolymerizable comonomers include monofunctional ethylenically unsaturated monomers as well as poly-unsaturated cross-linking monomers such as the diacrylates or dimethacrylates of dihydric alcohols. The latter compounds are represented by the general formula

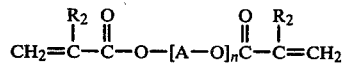

where $R_2$ is hydrogen or methyl, A is alkylene of 2 to 4 carbon atoms and n is an integer of 2 to 60 inclusive, preferably 3–30 inclusive. Such compounds include, for example, tetraethyleneglycol diacrylate, diethylene glycol dimethacrylate, etc. Additional polyunsaturated copolymerizable monomers are represented by the general formula

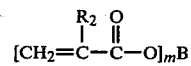

where $R_2$ is as previously defined, B is a saturated or unsaturated hydrocarbon residue of 4–24 carbon atoms, preferably 4–15 carbon atoms, and m is an integer of 2–4 inclusive. Illustrative of such compounds are trimethylolpropane triacrylate, etc. The monofunctional copolymerizable comonomers include, for example, methyl acrylate, ethyl acrylate, n-butyl acrylate, vinyl acetate, vinyl chloride, acrylonitrile, methacrylonitrile and the like. The amount of such comonomers used herein can vary widely. For example 8-50% by weight of comonomer in the total polymerizable mass is acceptable. Preferably 2-15%, most preferably 2-7% is of use herein.

It should be understood that, while the monomers of Formula I are used to prepare organometallic polymers of a single polyvalent metal, it is possible to prepare mixed metal copolymers by using mixtures of the different polyvalent organometallic monomers of Formula I or of any other prior art ethylenically unsaturated organometallic compound. For example, lead diacrylate or lead dimethacrylate can be employed as a copolymerizable monomer herein, as can the cross-linking polyunsaturated monomers such as lead dimethacrylate or lead diacrylate. As in the case of the other nonmetallic containing comonomers, these metalcontaining ones are employed to the point where no damaging effects are observed in either transparency or physical properties of the final product.

The organometallic monomers of Formula I are readily polymerized to give birth to polymers of optical transparency when treated with a polymerization catalyst or irradiated with a source of actinic light or radioactive emissions, such as gamma, beta or neutron rays. Preferably, the polymerization is effected in the presence of an initiator for radical polymerization, typically at temperatures of about $-10°$ to about $150°$ C., preferably at $40°-130°$ C. at times from about 5 minutes to about 48 hours using an initiator concentration of about 0.001 to 5.0%, preferably 0.02-1.0%, based on weight of the total amount of monomer(s) used. Typical examples of free radical producing initiators useful herein are the peroxides (optionally in combination with tertiary amines, e.g., dimethylaniline) such as lauroyl peroxide, t-butyl peroctoate, t-butyl peroxyisopropyl carbonate, benzoyl peroxide, dicumyl peroxide, t-butyl peroxyacetate, t-butyl peroxybenzoate, di-t-butyl peroxide, etc. and asobisisobutyronitrile.

The monomer of Formula I used to produce the transparent organometallic polymers of this invention are also novel compounds and are most conveniently prepared by the reaction sequence shown below

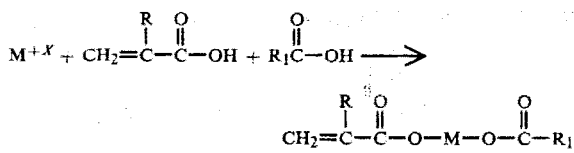

where R, $R_1$ and M are as previously described and X is an integer that is the valence (oxidation state) of metal M, with the proviso that X is $\geq 2$. In the above reaction, essentially a neutralization reaction, typically the oxides of the metal M are used, thereby advantageously producing water as byproduct. However, the pure metals or the metal salts of inorganic acids, such as halides; e.g., fluorides, chlorides, bromides, and iodides, sulfates, nitrates, phosphates, etc. as well as the organic acids, acetates, proprionates, butyrates, oxylates, malonates, etc. are also useful to form the polyvalent metal salt-containing monomer. In the case of utilizing pure metals in the reaction (to form the monomer of Formula I) the carboxylic acids react as a typical acid, generating the polyvalent metal salt and, as a by-product, hydrogen. In the latter case it is preferred to utilize an alkali or alkaline earth metal salt of the unsaturated and saturated carboxylic acids shown in the reaction sequence, the by-product from the reaction being an alkali or alkaline earth metal halide, sulfate, nitrate, phosphate, etc. Preferably the oxides or hydroxides of the metals are used herein to react with the free carboxylic acids, the by-product water being removed in a later step, typically by azeotropic distillation. Other conventional methods may be used to free the water from the resulting monomer mass, e.g., the addition of drying agents, such as molecular sieves, anhydrous magnesium sulfate and the like, chromatography, vacuum distillation, vacuum drying, etc.

It should be noted that, in oxidation states of greater than 2, the stoichiometry of the reaction (the amounts of unsaturated acid to saturated acid) can be adjusted to provide monomers with cross-linking capability. However, it is preferred that the monomer of Formula I contain only one unsaturated group.

The reactions discussed above to form the monomer of Formula I can be carried out in the absence or in the presence of an inert solvent. Typical organic inert solvents are the aromatic solvents, such as benzene, toluene, xylene, etc., the ketones such as acetone, methyl ethyl ketone, etc., the ethers such as tetrahydrofuran, diethylether, etc. dimethylformamide, dimethylsulfoxide and the like. When a solvent is utilized for the monomer preparation, it is particularly preferred to employ methylmethacrylate or ethylmethacrylate since: many of the metal containing monomers dissolve readily in it as do the carboxylic acids; it acts as an effective azeotropic liquid in the removal of by-product water (as discussed above); and any residual amounts of this solvent remaining after reaction of the reagents has been complete can enter into the polymerization reaction, i.e., it is a comonomer. The reaction is carried out until complete, typically 5 minutes to 48 hours at $10°$ to $150°$ C. Preferably the reaction is run at room temperature ($20°$ C.) for about 2 to about 4 hours. Water is the preferred solvent when using the alkali or alkaline earth metal carboxylate monomer preparation route.

It is generally preferred that the monomer product described hereinabove, is separated and/or isolated prior to its use as starting material for the polymerization. Separation and isolation can be effected by any suitable purification procedure such as, for example, evaporation, crystallization, column chromatography, thin-layer chromatography, distillation, etc. Specific illustrations of typical separation and isolation procedures can be had by reference to the appropriate examples described hereinbelow; however, other equivalent separation procedures can, of course, be used. Also, it should be appreciated that where typical reaction conditions (e.g., temperatures, mole ratios, reaction times) have been given, conditions both above and below these ranges can also be used, though generally less conveniently.

In the most preferred embodiment herein, it should be noted that a slight excess of the compound

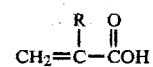

(up to about 5%) results in the formation of

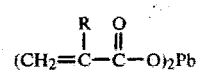

representing the insitu generation of a polyfunctional cross-linking monomer. Similarly, a slight excess of

(up to about 5%) results in the formation of

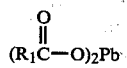

a nonreactive but plasticizing type of product, the latter composition is desirable when preparing polymeric products of less brittle character.

As used in the specification and the appended claims, the following terms have the meaning indicated. The term "halo or halide" refers to fluoro, chloro, bromo, or iodo or the corresponding halides. The term "$C_1$ to $C_{12}$ alkyl" refers to a straight or branched chain, monovalent substituent consisting solely of carbon and hydrogen, containing no unsaturation, and having from 1 to 12 carbon atoms. Examples of such alkyl groups are methyl, ethyl, n-propyl, i-propyl, n-butyl, t-butyl, n-hexyl, 2-methylpentyl, 2-ethylhexyl and the like. The term "$C_1$ to $C_6$ alkoxy" refers to the above disclosed alkyl groups linked through an ether linkage, having the free valence from the ether oxygen. Examples of such groups include methoxy, ethoxy, n-propoxy, i-propoxy, n-butoxy, t-butoxy, n-hexyloxy, and the like. The term "heterocyclic aryl, the heteroatom selected from oxygen, nitrogen and sulfur" is intended to mean the monovalent heterocyclic radicals of aromatic character containing, in addition to the heteroatom, 4 or 5 carbon atoms in the ring. Examples of these radicals are pyrryl, for example 2- or 3-pyrryl, pyridyl, for example 2-, 3- or 4-pyridyl, thienyl, for example 2- or 3thienyl and furyl, for example 2-furyl or 3-furyl. "Phenyl substituted with $C_1$ to $C_6$ alkyl, $C_1$ to $C_6$ alkoxy amino, $C_1$ to $C_4$ alkylamino, di $C_1$ to $C_4$ alkylamino, nitro or halo" is intended to include monosubstituted phenyl and polysubstituted phenyl. Such include methylphenyl, for example 2- or 3-methylphenyl, dimethylphenyl, for example 2,4- or 3,5 dimethylphenyl, methoxyphenyl, for example 2- or 3-methoxyphenyl, dimethoxyphenyl for example 2,4- or 3,5-dimethoxyphenyl, halophenyl for example 4-chlorophenyl or 4-bromophenyl, or dihalophenyl, for example 2,4-dichlorophenyl or 2,4-dibromophenyl, aminophenyl, for example 2-aminophenyl or 2,4- or 2,5 diaminophenyl, dimethylaminophenyl, di $C_1$ to $C_4$ alkylaminophenyl, for example dimethylaminophenyl, or diethylaminophenyl, $C_1$ to $C_4$ alkylaminoxhenyl for example methylaminophenyl, ethylaminophenyl, the amino group at positions 2,3- or 4 of the phenyl ring. "naphthyl substituted with $C_1$ to $C_6$ alkyl, $C_1$ to $C_6$ alkoxy, amino, $C_1$ to $C_4$ alkylamino, di $C_1$ to $C_4$ alkylamino, nitro or halo" is intended to mean the above phenyl substituents but attached to positions one or two of the naphthyl ring.

A further understanding of the invention can be had from the following non-limiting examples. As used hereinabove and below unless expressly stated to the contrary, all temperatures and temperature ranges refer to the centrigrade system and the terms ambient or room temperature refer to about 20° C. The term percent or (%) refers to weight percent and the term mole and moles refers to gram moles. The term equivalent refers to a quantity of reagent equal in moles to the moles of the preceding or succeeding reactant recited in that example in terms of moles of finite weight or volume.

EXAMPLE I (a) Into a 1 liter glass container equipped with an agitator are charged
  100 grams of methyl methacrylate (solvent);
  108 grams of methacrylic acid; and
  180 grams of 2-ethylhexanoic acid.
With vigorous agitation, 292 grams of lead monoxide (litharge) are added slowly over a 1 minute time period to prevent agglomeration. The vigorous agitation is continued for 30 minutes and reduced to a moderate level for two additional hours.

The resulting product (a syrup) is a slightly viscous, cloudy liquid. Upon standing at room temperature, a small amount of water (about 5 ml) forms on the surface and is removed with a pipet. The syrup is then clarified and further concentrated by passing through a Whatman #42 filter at 60° C. using 40 psig of nitrogen in a pressure filter (Millipore Model No. XX40-047-00). This concentration step is conducted at 60° C. using inert gas stripping to remove excess water and methylmethacrylate as an azeotrope that is essentially 12% water. The resulting concentrated syrup is a clear, viscous liquid with a lead content of 46% by weight and a density of 2.0 g/cc. I.R.:aliphatic $CH$,2850-3000 $cm^{-1}$; ester $C=O$, 1710-1730 $cm^{-1}$ and 1160-1200 $cm^{-1}$.

(b) To 40 grams of the warm syrup containing 10.2% methylmethacrylate at 60° C. is added 1.5 g of tetraethylene glycol diacrylate and 25 mg of t-butyl peroctoate. After thorough mixing, the mixture is flushed with a stream of dry nitrogen and poured into two 15×1.8 cm test tubes. The tubes are tightly stoppered using a piece of 1 mil FEP film as a liner under the stopper. The tubes are then placed in a 60° C. oil bath for 20 hours. The resulting cured polymers are extremely clear with a slight yellow-amber color. A one inch length of the cylindrical sample has a radiation attenuation characteristic equivalent to that of 1.5 mm of lead metal sheet using three phase 110 KVP X-rays. The sample has a hardness of Shore D80-84 and is similar in scratch resistance to standard commercial acrylic plastic sheet. Its density is 1.8 g/cc, and has a lead content of 43% with a refractive index of 1.55. I.R. (KBR pellet):Alaphatic $CH_2$, $CH_3$ and $C=O$, 1740 $cm^{-1}$.

EXAMPLE 2

Using the same procedure as in Example 1, except that 100 grams of (solvent) ethyl methacrylate are substituted for methyl methacrylate in the first step, the identical monomer is prepared and polymerized.

EXAMPLE 3

Using the same procedure as in Example 1, but substituting the t-butyl peroctoate of 1(b) with 25 mg of benzyolyl peroxide, the monomer is polymerized.

EXAMPLE 4

Using the same procedures as in Example 1 but substituting the t-butyl peroctoate of 1(b) with 40 mg of benzoyl peroxide and 5 mg of N,N-dimethylaniline, a cure was effected in two hours at room temperature.

EXAMPLE 5

Using the same procedure as in Example 1, except that 1 g of the following crosslinking agents are used to replace the 2.5 g of tetraethylene glycol diacrylate of 1(b): trimethylolpropane triacrylate; and divinyl benzene. The polymers cured to a Shore Hardness of D80-84 and have a scratch resistance similar to the polymer of Example 1.

EXAMPLE 6

Into a 250 ml Earlenmeyer flask equipped with an agitator are charged 50.0 grams of methyl methacrylate; 22.2 grams methacrylic acid; and 37.2 grams 2-ethylhexanoic acid. With vigorous agitation, 57.6 grams of lead monoxide is added slowly over a 1 minute time period to prevent agglomeration. The vigorous agitation is continued for 30 minutes until dissolution is complete forming a slightly cloudy, slightly yellow liquid having a calculated lead content of 32% by weight. The agitation is then reduced to a moderate level and the addition of 13 g (a 22% excess by weight) of lead monoxide is initiated. The additions are made in 1–2 gram increments over a 2½ hour time period. The resulting syrup has a calculated lead content of 36%.

The syrup is then placed in a 55° C. water bath and stirred in an open container to remove product water and methyl methacrylate by azeotropic vaporization (as discussed in Example 1). A weight reduction of 5% is obtained to give the syrup a calculated lead metal content of about 38% by weight.

To 8 grams of the above syrup in a 12 ml screw cap vial is added 10 mg t-butylperoctoate and 100 mg tetraethylene glycol diacrylate. The solution is mixed well, flushed with dry nitrogen, capped and placed in a 60° C. oil bath for 19 hours. A clear cured cylindrical sample results.

In a similar manner, a 5% and a 10% excess of lead monoxide are added to the syrup and the resulting solution polymerized.

EXAMPLE 7

In a similar manner to Example 1 but utilizing different metal oxides or salts and the alkali or alkaline earth metal salts of the organic acids, the following monomers are prepared (metallic compound, product monomer). Calcium hydroxide, calcium methacrylate 2-ethyl hexanoate; mercuric nitrate, mercuric acrylate hexanoate; cadium acetate, cadmium methacrylate acetate; zinc sulfate, zinc methacrylate 2-ethyl hexanoate; magnesium oxide, magnesium acrylate octanoate; and strontium chloride, strontium methacrylate undecanoate.

We claim:

1. An optically transparent organometallic homopolymer prepared from a polyvalent metal salt-containing monomer of the formula

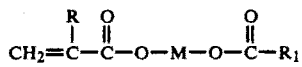

wherein M is a polyvalent metal, R is $C_1$–$C_{12}$ alkyl, $R_1$ is $C_1$ to $C_{12}$ alkyl, phenyl or naphthyl unsubstituted or substituted with $C_1$ to $C_6$ alkyl, $C_1$ to $C_6$ alkoxy, amino, $C_1$ to $C_4$ alkylamino, di $C_1$ to $C_4$ alkylamino, nitro or halo or heterocyclic aryl, the heteroatom selected from the group nitrogen, oxygen and sulfur.

2. The homopolymer in accordance with claim 1 wherein said polyvalent metal is selected from the group magnesium, zinc, strontium, cadmium, calcium, mercury and lead.

3. The homopolymer in accordance with claim 2 where R is $C_1$ to $C_4$ alkyl and $R_1$ is $C_1$ to $C_8$ alkyl.

4. The homopolymer in accordance with claim 3 wherein R is methyl or ethyl, $R_1$ is selected from the group methyl, ethyl, isopropyl, isobutyl and 2-ethylhexyl and M is lead.

5. The homopolymer in accordance with claim 4 wherein R is methyl and $R_1$ is 2-ethylhexyl.

6. An optically transparent organometallic polymer prepared from a polyvalent salt-containing monomer of the formula

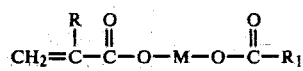

where M is a polyvalent metal, R is $C_1$ to $C_{12}$ alkyl, $R_1$ is $C_1$ to $C_{12}$ alkyl, phenyl or naphthyl, unsubstituted or substituted with $C_1$ to $C_6$ alkyl, $C_1$ to $C_6$ alkoxy, amino, $C_1$ to $C_4$ alkylamino, di $C_1$ to $C_4$ alkylamino, di $C_1$ to $C_4$ alkylamino, nitro or halo or heterocyclic aryl, the heteroatom selected from the group nitrogen, oxygen and sulfur; and at least one polyfunctional monomer selected from the group

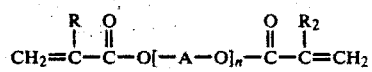

where $R_2$ is hydrogen or methyl, A is alkylene of 2 to 4 carbon atoms and n is integer of 2 to 60 inclusive and

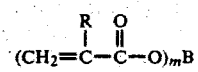

where $R_2$ is as previously defined, B is a saturated or unsaturated hydrocarbon residue of 4–24 carbon atoms and m is an integer of 2 to 4 inclusive.

7. The polymer in accordance with claim 6 wherein said polyvalent metal is selected from the group magnesium, zinc, strontium, cadmium, calcium, mercury and lead.

8. The polymer in accordance with claim 7 where R is $C_1$ to $C_4$ alkyl, $R_1$ is $C_1$ to $C_8$ alkyl, the polyfunctional monomer is

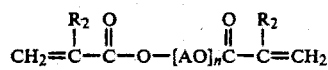

wherein n is an integer of 3 to 30 inclusive and B is a saturated or unsaturated hydrocarbon residue of 4–15 carbon atoms.

9. A process for preparing an optionally transparent organometallic homopolymer comprising polymerizing a polyvalent metal-containing monomer of the formula

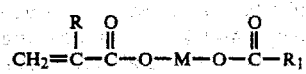

wherein M is a polyvalent metal, R is $C_1$ to $C_{12}$ alkyl, $R_1$ is $C_1$ to $C_{12}$ alkyl, phenyl or naphthyl unsubstituted or substituted with $C_1$ to $C_6$ alkyl, $C_1$ to $C_6$ alkoxy, amino, $C_1$ to $C_4$ di $C_1$ to $C_4$ alkylamino, nitro or halo or heterocyclic aryl, the heteroatom selected from the group nitrogen, oxygen and sulfur.

10. The process in accordance with claim 9 wherein said polyvalent metal is selected from the group magnesium, zinc, strontium, calcium, cadmium, mercury and lead.

11. The process in accordance with claim 10 wherein R is $C_1$ to $C_4$ alkyl and $R_1$ is $C_1$ to $C_8$ alkyl.

12. The process in accordance with claim 11 wherein R is methyl or ethyl, $R_1$ is selected from the group methyl, ethyl, isopropyl, isobutyl and 2-ethylhexyl and M is lead.

13. The process in accordance with claim 12 wherein R is methyl and $R_1$ is 2-ethylhexyl.

14. A process for preparing an optically transparent organometallic polymer comprising polymerizing a polyvalent salt-containing monomer of the formula

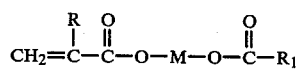

where M is a polyvalent metal, R is $C_1$ to $C_{12}$ alkyl, $R_1$ is $C_1$ to $C_{12}$ alkyl phenyl or naphthyl, unsubstituted or substituted with $C_1$ to $C_6$ alkyl, $C_1$ to $C_6$ alkoxy, amino, $C_1$ to $C_4$ alkylamino, di $C_1$ to $C_4$ alkylamino, di $C_1$ to $C_4$ alkylamino, nitro or halo or heterocyclic aryl, the heteroatom selected from the group nitrogen, oxygen and sulfur; and at least one polyfunctional monomer selected from the group

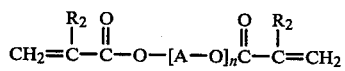

where $R_2$ is hydrogen or methyl, A is alkylene of 2 to 4 carbon atoms and n is an integer of 2 to 60 inclusive and

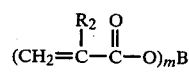

where $R_2$ is as previously defined, B is a saturated or unsaturated hydrocarbon residue of 4–24 carbon atoms and m is an integer of 2 to 4 inclusive.

15. The process in accordance with claim 14 wherein said polyvalent metal is selected from the group magnesium, zinc, strontium, cadmium, calcium, mercury and lead.

16. The process in accordance with claim 15 wherein R is $C_1$ to $C_4$ alkyl, $R_1$ is $C_1$ to $C_8$ alkyl, the polyfunctional monomer is

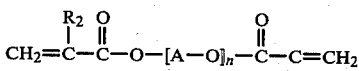

wherein $R_2$ is as previously defined, n is an integer of 3 to 30 inclusive and B is a saturated or unsaturated hydrocarbon residue of 4–15 carbon atoms.

17. An optically transparent, radiation shielding material prepared from a monomer of the formula

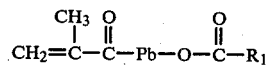

wherein $R_1$ is selected from the group methyl, ethyl, isopropyl, isobutyl and 2-ethylhexyl; at least one comonomer selected from the group methylmethacrylate, tetraethyleneglycol diacrylate and mixtures thereof; and a free radical initiator.

* * * * *